UNITED STATES PATENT OFFICE.

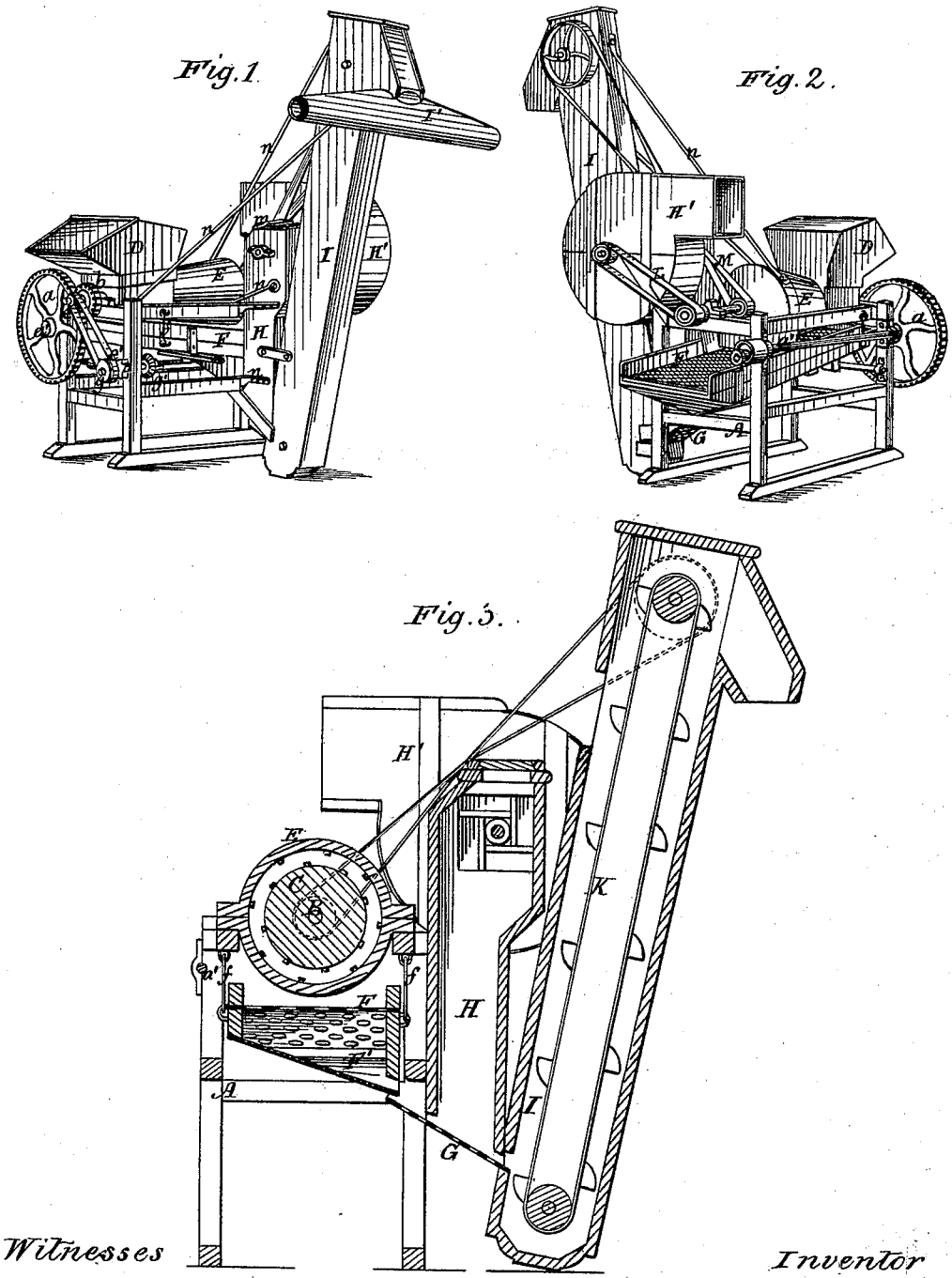

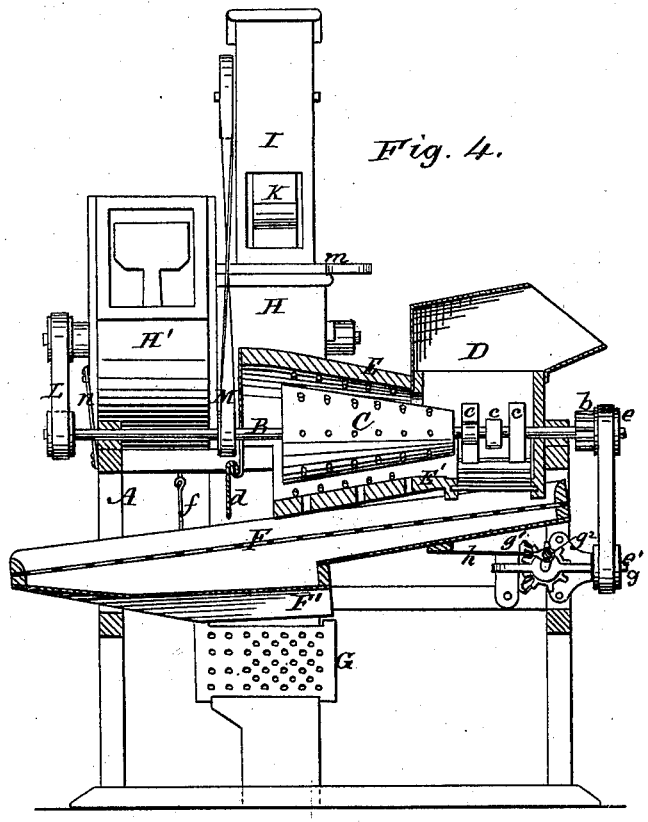

CALEB C. BURROUGHS, OF DECATUR, ILLINOIS.

IMPROVEMENT IN CORN-SHELLERS.

Specification forming part of Letters Patent No. 207,163, dated August 20, 1878; application filed May 16, 1878.

*To all whom it may concern:*

Be it known that I, CALEB C. BURROUGHS, of Decatur, in the county of Macon and State of Illinois, have invented certain new and useful Improvements in Corn-Shellers; and that the following is a full, clear, and exact description of the same, reference being had to the accompanying drawings, making a part of this specification, in which—

Figure 1 represents, in perspective, the front and right side of the machine. Fig. 2 represents, in perspective, the rear and left side of the same. Fig. 3 represents a transverse vertical section of the machine on a line passing through the elevator. Fig. 4 represents a longitudinal vertical section of the same.

My invention relates to improvements in that class of corn-shellers in which a truncated cone mounted upon a horizontal shaft is used as a shelling device.

My invention consists in a single-taper shelling-cone extending partly under the feeding-hopper, in combination with rotary beaters or feeders, also located under the hopper.

It also consists in combining with a conical corn-sheller an oscillating screen; also a stationary screen adjoining the foot of the elevator, and a suction-fan placed above the sheller's frame, by means of which the cleaning of the corn is done while passing from the sheller to the elevator.

It also consists in a corn-cleaning apparatus easily connected by hooks and rods and disconnected for transportation, in two parts, viz., a conical sheller with oscillating screen, and a stationary screen, suction-fan, and elevator, as will hereinafter be described.

In the drawings, A represents the frame of the sheller; B, the cylinder-shaft, carrying the single-taper truncated shelling-cone C, extending partly under the hopper D, to feeding or advance of the corn. Upon the shaft B is also mounted a series of beaters, $c$, to prevent the corn from arching in the hopper and to begin the shelling. The shaft B may be driven by a belt and pulley upon its extremity; but for convenience in using it with a horse-power, I attach to this shaft a pinion, $b$, that meshes with a gear-wheel, $a$, mounted upon a shaft, $a'$, parallel to the shaft B, and this shaft $a'$ is connected to a horse-power in the usual manner. As the pinion $b$ and gear-wheel $a$ are adjacent to the hopper, they are, for safety, generally incased.

The shelling-cone C and its casing E are provided with teeth. The lower part of the casing is enlarged at the throat E' to facilitate the introduction of the corn between it and the cone, and said lower casing has also perforations to allow the grains of corn to escape, and the receptacle under the beaters is slotted for the same purpose. The corn and cobs, forced by centrifugal motion to the rear of the cone, are arrested by a swinging apron, $d$, and fall upon an oscillating screen, F, suspended by rods $f$ from the frame A. The grains of corn and the fine dust and particles pass through the meshes of the screen upon its inclined bottom, and the cobs escape over the tail end of the same.

Oscillating motion is imparted to the screen F as follows: Upon one end of the cylinder-shaft B is mounted a pulley, $e$, which transmits its motion, by means of a belt and pulley, $e'$, to a short shaft, $g$, parallel to the shaft B. The shaft $g$ carries a bevel-pinion, $g^1$, that meshes with a similar pinion upon the crank-shaft $g^2$, and the crank of this last shaft is united to the screen F by a connecting-rod, $h$, that causes it to oscillate at each revolution of the shaft. The corn passing through the screen F falls upon its inclined bottom F', and is by it directed to one side, from which it escapes and falls upon a stationary inclined screen or perforated plate, G. Above this plate, and in near contact, so as to allow only a sheet of the grain to pass upon it at a time, is the down-leg H of the suction-fan H', the two being so arranged that the fine and heavy particles of sand can fall through the perforations of the plate G, while the light particles, dust, and impurities are drawn, with the strong current of air admitted through the perforations, up through the leg H into the fan, and are blown to the opposite side from the elevator. Thus the cob-discharge, the elevator, and the working sides of the machine are free from dust. The corn, after passing over the second screen through a strong up-current of air, enters the elevator I, in which it is raised by an endless belt, K, to the discharge end, and, if desired, through a double spout, I', ready for loading into wagons, or for sacking, as may be required.

The suction-fan and the elevator are operated by belts L and M and pulleys connected with the cone-shaft B, and the suction-draft can be regulated by means of the sliding gate $m$ on top of the down-leg H and adjoining the eye of the fan. The elevator and fan are connected to the sheller and its frame by hooks and rods $n$, so that in moving from place to place the elevator and fan are easily taken down without loosening any bolts, thus producing a machine that can be readily moved and put in position for work.

Having now fully described my invention, I claim—

1. The combination of a single-taper truncated shelling-cone, extending partly under the feeding-hopper, with rotary beaters or feeders, also located under the hopper on the horizontal axis of the shelling-cone, and a conical casing enlarged at the throat, substantially as described.

2. The combination of the hopper, the truncated shelling-cone, the oscillating screen beneath and parallel with the cone and its casing, the inclined stationary screen or perforated plate fed from the bottom board of the oscillating screen, and the suction-fan, with its down-leg immediately over the stationary screen and its spout directed to the opposite side from the final delivery of the corn, substantially as set forth.

3. In combination with a shelling mechanism and an oscillating screen mounted on the same frame, the stationary screen G, suction-fan having a down-leg over said screen, and grain-elevator connected to said down-leg and screen, substantially as shown and described.

CALEB C. BURROUGHS.

Witnesses:
A. R. MONTGOMERY,
GEORGE C. MARK.